(12) United States Patent
Logstrup

(10) Patent No.: US 6,638,338 B2
(45) Date of Patent: Oct. 28, 2003

(54) BIOLOGICAL FILTER SYSTEM AND A HOUSING FOR A BIOLOGICAL FILTER SYSTEM

(76) Inventor: Jorgen Logstrup, Holbergsgade 13, 1, Copenhagen K (DK), DK-1057

( * ) Notice: Subject to any disclaimer, the term of this patent is extended or adjusted under 35 U.S.C. 154(b) by 0 days.

(21) Appl. No.: 10/033,170

(22) Filed: Dec. 27, 2001

(65) Prior Publication Data

US 2002/0104436 A1 Aug. 8, 2002

(30) Foreign Application Priority Data

Dec. 29, 2000 (DK) .................................... 2000 01946

(51) Int. Cl.⁷ .............................................. B01D 53/04
(52) U.S. Cl. .............................. 95/90; 95/141; 95/274; 422/120
(58) Field of Search ............................. 422/120; 95/90, 95/141–144; 96/223; 47/66.6

(56) References Cited

U.S. PATENT DOCUMENTS

| 4,732,591 A | * | 3/1988 | Tujisawa et al. ............... 96/135 |
| 4,961,763 A | * | 10/1990 | Thompson et al. ............ 55/312 |
| 5,089,036 A | * | 2/1992 | Hawes .......................... 96/108 |
| 5,130,091 A | * | 7/1992 | Saceman ......................... 422/4 |
| 5,180,552 A | * | 1/1993 | Saceman ......................... 422/1 |
| 5,217,696 A | * | 6/1993 | Wolverton et al. .......... 422/121 |
| 5,277,877 A | * | 1/1994 | Jeffrey et al. ................ 47/66.6 |
| 5,397,382 A | * | 3/1995 | Anderson ...................... 96/135 |
| 5,407,470 A | * | 4/1995 | Jutzi ............................. 96/121 |
| 5,433,923 A | | 7/1995 | Wolverton et al. .......... 422/121 |
| 5,599,713 A | * | 2/1997 | Sato .......................... 435/300.1 |
| 5,635,394 A | * | 6/1997 | Horn ............................. 435/266 |

FOREIGN PATENT DOCUMENTS

| DE | 4208243 | 7/1993 |
| DE | 19521239 | 12/1996 |
| DE | 29813378 | 10/1998 |
| DE | 19618369 | 8/1999 |
| JP | 3-296410 A | * 12/1991 |
| JP | 10-309420 A | * 11/1998 |
| WO | WO 96/41673 A1 | * 12/1996 |

* cited by examiner

Primary Examiner—Duane Smith
Assistant Examiner—Frank M. Lawrence
(74) Attorney, Agent, or Firm—Darby & Darby

(57) ABSTRACT

A method for cleaning and conditioning air in which the air is first passed through or along water in a reservoir, then passed through a layer of soil to clean and condition the air, and then passed through a layer of a germ-reducing material.

11 Claims, 2 Drawing Sheets

BIOLOGICAL FILTER SYSTEM AND A HOUSING FOR A BIOLOGICAL FILTER SYSTEM

The invention relates to a biological filter system for cleaning air and a housing for a biological filter system. Moreover the invention relates to a method of cleaning and conditioning air.

The invention is based on the knowledge that soil, which contains microorganisms and serves as a substrate for plants, has a capacity to clean air and remove harmful particles and gasses from the air. This knowledge has been published by NASA and is a result of NASA research.

The recognition of such qualities of soil and plants has led to the use of soil and plants in pollution control. The advantage is that such pollution control is extremely friendly to the environment.

In recent years use of soil and plants in pollution control has gained commercial and practical interest and has become more and more common.

DE 195 21 239 A 1 discloses a bioactive filter for rooms. The filter comprises a housing wherein an inner container with filter material is placed. The filter material consists of porous material with high absorption capacity. Filter material can be open-pored different clay granules, humus, colloids, active charcoal, compost, specific chemical binders, limestone, magnesium oxide, calcite, etc. in different mixtures. Filter material can either have a general absorption to particles and chemicals or specific absorption, biological or chemical binding to specific gas compounds. The filter media allow plants with earth root balls to be planted. The air is driven through the filter by means of a fan. The filter provides good cleaning of the air, but does not stop germ cells and does not contribute to the general conditioning of the climate in the room.

The drawback of the known biological filters is that they do not stop germ cells from entering a location with the cleaned air. The germ cells may for instance enter the air from the soil that the air passes through.

One object of the present invention is to provide a filter system that will stop germ cells and other particles in the air effectively during the cleaning process.

Another object of the present invention is to provide a filter system that will de-gas and break down harmful gasses in the air effectively during the cleaning process.

A further object of the present invention is to provide a filter system that will contribute to the air-conditioning in a room with regard to temperature and relative humidity.

Moreover it is an object of the present invention to provide a self-irrigation system of soil and plants from a water reservoir.

These objects and other objects are met by the invention as defined in the claims.

The invention provides a biological filter system and a method for cleaning and conditioning air which are environmentally friendly and which result in a significant reduction of particles and harmful gases in the air.

The biological filter can be produced in various sizes and has an appearance like flowerpots, boxes, partition walls, or ground plants. The invention is thereby able to contribute to the decoration of a room or landscape and simultaneously clean and condition the air in the room or landscape.

In a first aspect the invention relates to a biological filter system for cleaning air comprising a reservoir for water, a layer of soil, and a germ-reducing layer.

The biological filter is a part of a closed system, which the air is passed through as will be explained later.

The purpose of the reservoir for water is to moisten air and wet the layer of soil. The layer of soil holds back particles and gasses and optionally breaks down those particles and gasses in microbiologically processes in the soil, thereby cleaning the air passing through it.

The purpose of the germ-reducing layer is of course to reduce the number of germ cells in the air. The germ cells may be germ cells of bacteria and fungi that may enter the air from the soil. Furthermore the purpose of the germ-reducing layer is to prevent growth of bacteria and fungi at least in the surface of the soil, preferably at least into a depth of 2 mm of the soil.

In a preferred embodiment of the invention the biological filter system further comprises a compressor room.

In another preferred embodiment of the biological filter system of the invention the germ-reducing layer comprises material, which kills or destroys germ cells of bacteria and fungi.

Such material can be chosen among material having a high or low pH value or basic or acidic material. Useful basic material preferably has a pH>10 and useful acidic material preferably has a pH<4. Other useful materials have a pH of about 7–9.

Preferably the material is selected from the group consisting of limestone, dolomite, calcite, magnesite, celluloses, hemicelluloses, woodchips and a combination thereof The exact mechanism of the disinfective effect of the germ-reducing layer is not known. The disinfection may be caused by the influence of ions, such as Mg- or Ca-ions, but the invention is not limited to this theory.

Besides killing and destroying germ cells the germ-reducing layer may also act as a mechanical filter for particles and is preferably also capable of absorbing various particles.

Preferably the material constituting the germ-reducing layer has an average particle size from 0.1 to 7.0 cm measured by sieving.

Preferably the thickness of the germ-reducing layer is from 0.1 to 10 cm, more preferred from 0.5 to 6 cm.

In another preferred embodiment of the biological filter system according to the invention the reservoir for water is placed directly in or below the layer of soil, with air pockets or a distance between the surface of the water and the bottom of the layer of soil, said volume or distance being sufficient to allow a flow of air in the soil or between the surface of the water in the reservoir and the bottom of the layer of soil, preferably said distance is within the range of 0.1 to 15 cm.

Hereby it is possible for the air to pass over the water in the reservoir and collect moisture and immediately after enter the layer of soil. A porous bottom plate, e.g. a metal plate with holes, preferably supports the layer of soil. The distance between the surface of the water and the bottom of the layer of soil will, of course, vary with the amount of water present in the reservoir.

Furthermore the reservoir for water may be connected to the layer of soil, preferably by use of one or more wicks. The wicks will draw water from the reservoir up into the layer of soil and thereby wet the soil and optionally the roots of plants present in the soil. When the layer of soil is supported by at bottom plate this may by coated with a porous cloth which is connected to the wicks and will help wetting the soil. This preferred embodiment facilitates self-irrigation of soil and plants.

Preferably the biological filter system according to the invention comprises means for forcing the air through the filter-system. The means comprises an inlet for air to be cleaned and substantially airtight chambers where pressure can be created to force the air through the biological filter system. The pressure can be created by use of a fan, ventilator, or the like.

In yet a preferred embodiment of the biological filter system according to the invention the layer of soil comprises humus and/or clay with microbiologic activity. The microbiological activity appears naturally in humus and is caused by bacteria and other microorganisms naturally present in humus, clay and soil. The layer of soil may also comprise expanded clay or other porous material in order to make the soil sufficiently porous to allow a flow of air to pass through it.

Preferably the layer of soil has a porosity which allows a flow of air through said layer of soil of 200–500 $m^3/m^2$ h, more preferred 300–400 $m^3/m^2$ h.

The layer of soil preferably has a thickness from 5 to 80 cm, more preferred a thickness of 15 to 50 cm.

In another preferred embodiment the layer of soil constitutes the substrate for one or more plants. The substrate serves as a growth media for a wide range of plants, which in combination with the layer of soil contributes to the processes, which cleans the air. Furthermore the photosynthesis of the plants will absorb carbon dioxide in the air and release oxygen, thereby improving the quality of the air.

In the biological filter system according to the invention the plant are preferably selected among the group consisting of *Aloe barbadensis, Musa oriana, Aglaonema modestum, Philodendron domesticum, Hedera helix, Ficus benjamina, Gerbera jamesonii, Epipremnum aureum, Philodendron oxycardium, Dracaena deremensis, Philodendron selloum, Dracaena marginata, Dracena massangeana, Brassaia arboricola, Sansevieria laurentii, Tradescantia sillamontana, Spathiphyllum "Mauna Loa", Peperomia obtusifolia, Chrysanthemum morifolium, Chlorophytum elatum, Syngonium podophyllum, Dracaena deremensis "Warneckii"*.

The physical function of the vegetation is to construct and keep up the porosity of the soil by the secondary porosity constructed by successful vegetative parts of the plants (root, rootstock, stem, stalk, etc.). Every plant species produce a special combination of root exudates (glucose, amino acids, etc.) that support growth of specific micro activities. Specific plant species and soil combination can be selected for absorption of and destroying specific contaminants.

In a second aspect of the invention the invention relates to a housing for a biological filter system comprising
an inlet for air,
a reservoir for water,
a holder for a layer of soil and a germ-reducing layer, wherein the housing is constructed so that air is guided from the inlet over the surface of the water and thereafter through the layer of soil and through the germ-reducing layer or guided directly into the soil.

In a preferred embodiment of the housing for a biological filter system the reservoir for water is connected to the layer of soil preferably though one or more wicks. Hereby the water in the reservoir wets the layer of soil and facilitates the self-irrigation of soil and plants in the housing.

Preferably the housing comprises means for guiding the air through the housing and the biological filter system, and preferably the means are in the form of a fan, a ventilator, a pump or a compressor. Hereby it is possible to create the necessary pressure to force the air though the layer of soil and the germ-reducing layer. In another preferred embodiment of the housing for a biological filter system the holder for the layer of soil and a germ-reducing layer comprises a perforated bottom plate. The perforated bottom plate supports the layer of soil and the germ-reducing layer and simultaneously allows passage of air. The bottom plate may be applied with a wetable porous cloth, which may be connected to the water reservoir via one or more wicks. By use of a cloth between the bottom plate and the layer of soil the soil is wetted more efficiently.

It is also preferred that the housing for the biological filter system comprises means for detecting the amount of water in the reservoir. The detecting system may be mechanical, e.g. a floater in a tube, or electronic, e.g. using sensors, and indicate the level of water visually or audio-visually.

Preferably the housing for a biological filter system comprises means for filling water into the reservoir. The water can be filled into the reservoir via a tubular connection in the housing. The advantage is that it is not necessary to disassemble the housing when the reservoir needs to be refilled.

In a third aspect the invention relates to a method for cleaning and conditioning air that comprises the steps of:
passing the air through or along a water reservoir,
passing the air though a layer of soil to clean and conditioning the air,
passing the air through a germ-reducing layer.

Passing the air through a water reservoir means that the air is forced to flow over the surface of water in a reservoir. Preferably the water reservoir is placed right below the layer of soil, which the air is forced through after passing the water reservoir.

In an important embodiment of the method according to the invention the temperature of the air is reduced, preferably by pressure or flow regulation, by 1–8° C., preferably 3–8° C., more preferable 2–5° C., during the passage through the layer of soil. The air is cooled during the passage through the soil and the relative humidity of the air is increased partly through water uptake and partly through reduction of temperature.

Higher pressure and higher flow (m/s) through the filter will increase the reduction of temperature relatively and total for the whole volume.

When the air is released from the layer of soil, the air will cool the ambient air, and the ambient air will heat the air. The relative humidity in the air is thus decreased so that the relative humidity in the total amount of air will be regulated to preferable about 70–90%.

In this way the method contributes to a stable climate in the room by lowering the room temperature and regulating the relative humidity.

Accordingly, the system and the method of the invention are suitable for office environments, electronics rooms and other accommodations wherein the keeping of an essentially fixed temperature and stable relative air humidity as well as avoiding statically electricity is important.

According to a preferred embodiment of the method air is passed through soil and preferably soil with microbiological activity and constituting a substrate for plants. In natural soil microbiological activity is normal and is caused by bacteria and other microorganisms, which are able to transform one substance to another substance, e.g. a hazard substance to a harmless substance.

According to another preferred method air is passed through a germ-reducing layer constituted by germ-reducing material, said material preferably being selected from the group consisting of limestone, dolomite, calcite, woodchips or a combination thereof In a preferred embodiment of the method the number of germ cells is reduced during the passage through the germ-reducing layer. Preferably the number of germ cells is reduced by 50%, more preferably by 70% and even more preferably by 90% by weight.

In another preferred embodiment of the method according to the invention harmful gasses in the air are absorbed and/or broken down during the passage through the layer of soil. By the term harmful gasses is meant gasses, which may cause deceases and allergic reactions on humans. For example it is well known that benzene may cause cancer. The harmful gasses are removed and broken down by the microbiological activity in the soil, and preferably the harmful gasses are benzene, formaldehyde, trichlorethylene, toluene, acetone, bromides, chlorides, etc.

Moreover in a preferred embodiment of the method substantially all particles with an average size from 2 μm are removed from the air during the passage through the layer of soil and the germ-reducing layer. Preferably the concentration of particles in the cleaned air is reduced by at least 70% compared with the outside air, and preferably the concentration of particles in the cleaned air is reduced by at least 45% compared with the inside air.

In one aspect the invention also relates to use of the biological filter system for cleaning and conditioning of air.

An aspect of the invention is use of the method for cleaning and conditioning of air.

The invention will now be described with reference to the drawings where

Figure 1:
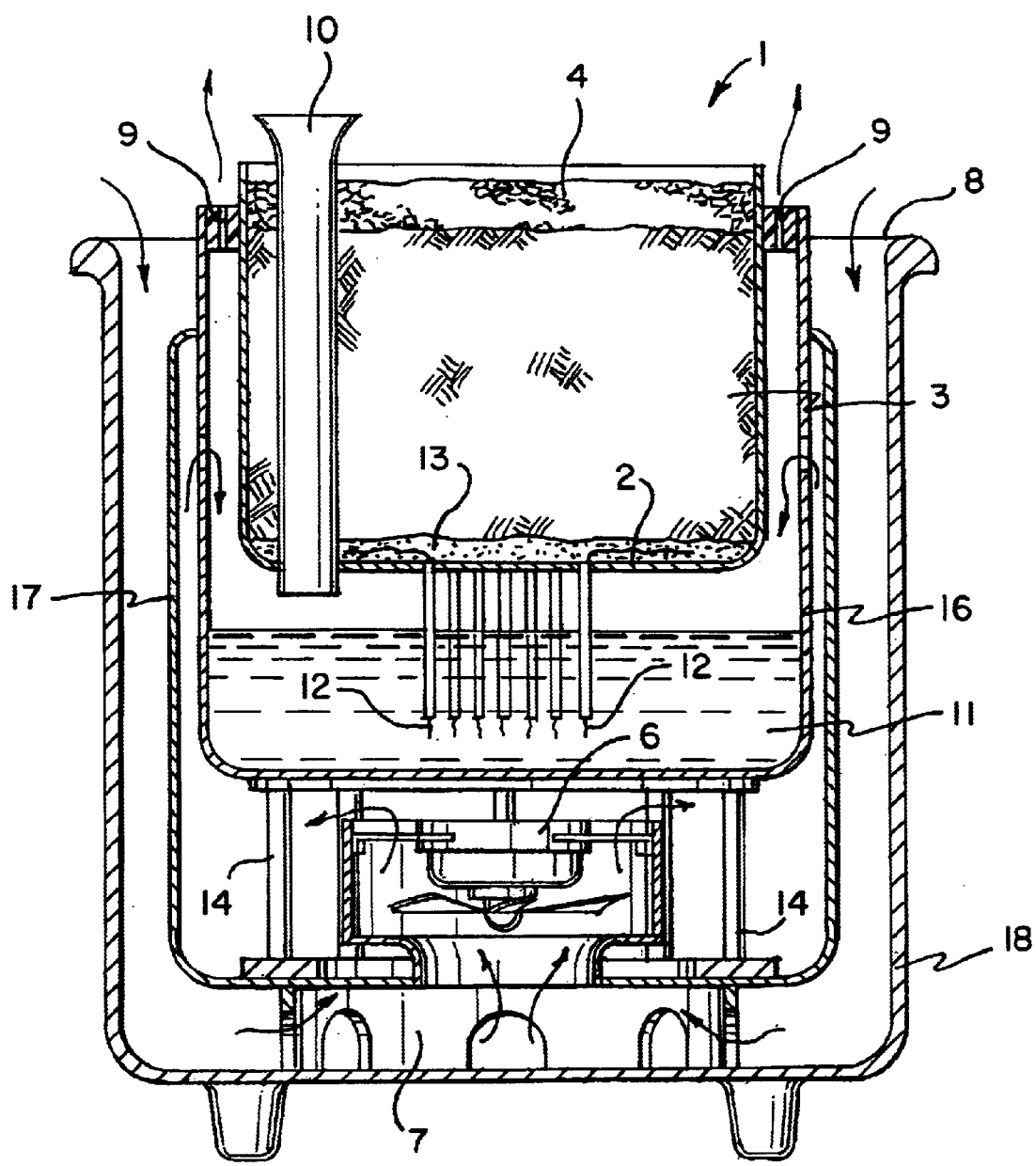
FIG. 1 shows an embodiment of a biological filter system and a housing according to the invention.

In FIG. 1 a biological filter system 1 is seen in a housing comprising an outer shell 18 and inner shells 17 and 16. The biological filter system comprises a layer of soil 3 and a germ-reducing layer of limestone as top-layer 4 and a reservoir for water 11. The layer of soil 3 and the germ-reducing layer 4 are supported by a perforated bottom plate 2. The layer of soil 3 is connected to the reservoir for water 11 with capillary tubes with wicks 12 and a capillary distribution carpet 13. Furthermore the filter system has a tubular connection 10 usable for filling water into the reservoir 11.

In use the air enters via an inlet 8 and is guided to the reservoir 11 by use of a fan 6 and cavities formed between the outer shell 18 and the inner shell 17. A pressure is built up in the room 5, and the air is guided to the reservoir 11 via holes in the inner shell 16.

The air passes over the surface of the water in the reservoir 11 and through the layer of soil 3, where the air is cleaned and cooled. Finally the air passes the germ-reducing layer 4, which removes substantially all germ cells from bacteria and fungi in the air.

In order to prevent the cleaned air to be drawn into the filter system, the housing comprises orifices 9 surrounding the air outlet of the filter system 1. An upward stream of pressurised air passes through the orifices 9 and guides the cleaned air away from the system.

The system reduces the content of bacteria in air by 80–90% and the content of fungi by 90%.

The content of particles in the air is reduced by 75%.

Figure 2:
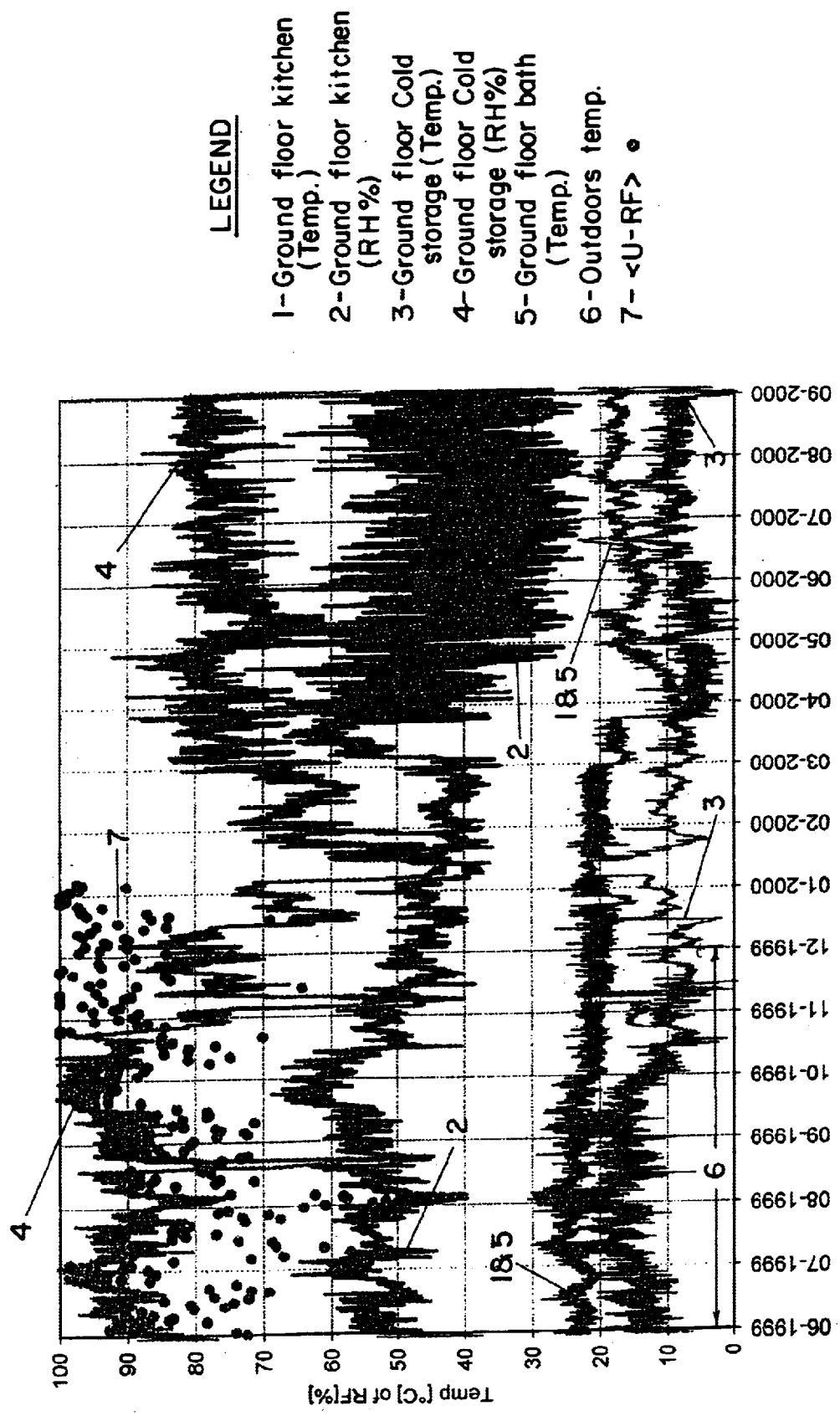
FIG. 2 shows measurements of humidity and temperature in a house before and after installation of a filter system according to the invention.

In FIG. 2 is shown the results of measurements of humidity and temperature in "the blue house" in Denmark before and after installation of a filter system according to the invention.

What is claimed is:

1. A method for cleaning and conditioning air comprising the steps of:

passing the air through or along water in a reservoir, passing the air through a layer of soil to clean and condition the air, and passing the air through a separate layer of a germ-reducing material.

2. A method according to claim 1 wherein the relative humidity of the air is increased to 75–95% during the passage through the layer of soil.

3. A method according to claim 1 wherein the air is passed through soil, preferably soil with microbiological activity and constituting a substrate for plants.

4. A method according to claim 1 wherein the number of germ cells in the air is reduced during the passage through the germ-reducing layer.

5. A method according to claim 1 wherein harmful gases in the air are absorbed and/or broken down during the passage through the layer of soil.

6. A method according to claim 5, wherein said harmful gasses comprise at least one of benzene, formaldehyde, trichlorethylene, toluene, acetone, bromides and chlorides.

7. A method according to claim 1 wherein substantially all particles with an average size from 2 μm are removed from the air during the passage through the layer of soil and the germ-reducing layer.

8. The method according to claim 1 wherein the layer of germ reducing material is on top of said layer of soil.

9. A method for cleaning and conditioning air comprising the steps of:

passing the air through or along a water reservoir, passing the air through a layer of soil to clean and conditioning the air, and passing the air through a germ-reducing layer wherein the temperature of the air is reduced by 1–8° C., preferably 3–8° C., more preferably 2–5° C., during the passage through the layer of soil.

10. A method according to claim 9 wherein the step of reducing the temperature is accomplished by regulating at least one of the pressure and flow of the air passing through the germ reducing layer.

11. A method for cleaning and conditioning air comprising the steps of:

passing the air through or along a water reservoir, passing the air through a layer of soil to clean and conditioning the air, passing the air through a germ-reducing layer of a material selected from the group consisting of at least one of limestone, dolomite, calcite, magnesite, celluloses, hemicelluloses and woodchips.

* * * * *

UNITED STATES PATENT AND TRADEMARK OFFICE
CERTIFICATE OF CORRECTION

PATENT NO. : 6,638,338 B2
DATED : October 28, 2003
INVENTOR(S) : Jorgen Logstrup It is certified that error appears in the above-identified patent and that said Letters Patent is hereby corrected as shown below:

<u>Title page,</u>
Item [75], Inventor's address, delete "Holbergsgade 13, 1, Copenhagen K (DK), DK - 1057" and substitute -- Postgaardsvej 11 DK-9260 Gistrup, Denmark --.

Signed and Sealed this

Fourth Day of May, 2004

JON W. DUDAS
*Acting Director of the United States Patent and Trademark Office*